Nov. 3, 1953
J. D. BENNETT
2,657,905
TRAVELING BLOCK
Filed June 6, 1951
6 Sheets—Sheet 1
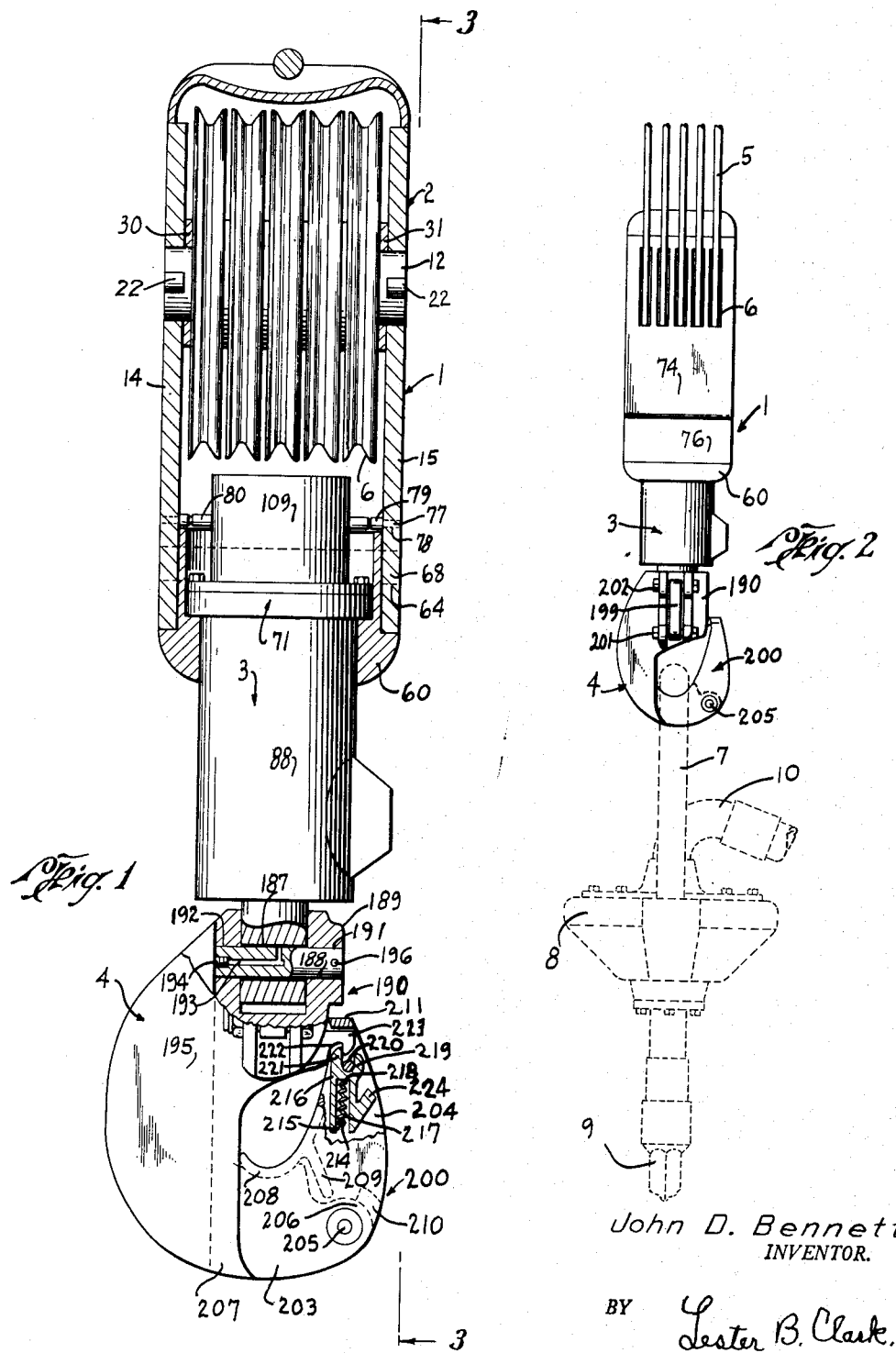
John D. Bennett
INVENTOR.
BY Lester B. Clark.
ATTORNEY Nov. 3, 1953  J. D. BENNETT  2,657,905
TRAVELING BLOCK
Filed June 6, 1951  6 Sheets-Sheet 2

John D. Bennett
INVENTOR.

BY Lester B Clark
ATTORNEY

Nov. 3, 1953          J. D. BENNETT         2,657,905
TRAVELING BLOCK
Filed June 6, 1951                                 6 Sheets-Sheet 3
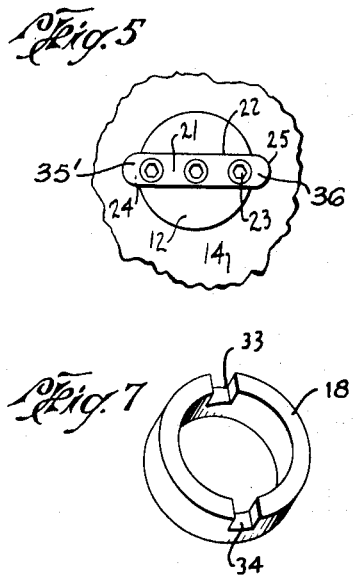
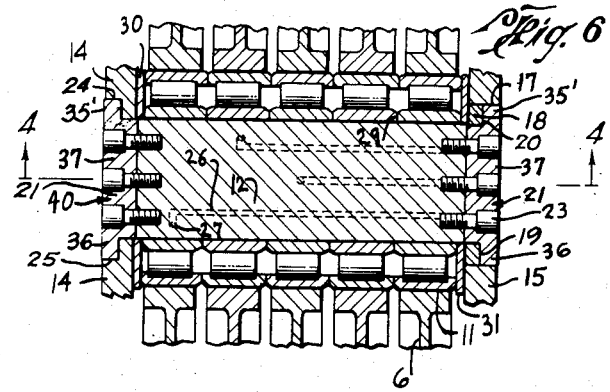
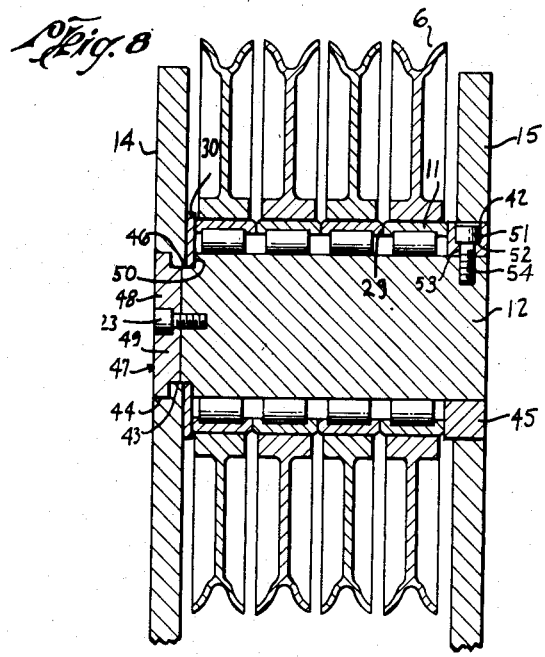
John D. Bennett
INVENTOR.
BY Lester B. Clark,
ATTORNEY Nov. 3, 1953
J. D. BENNETT
2,657,905
TRAVELING BLOCK
Filed June 6, 1951
6 Sheets-Sheet 4
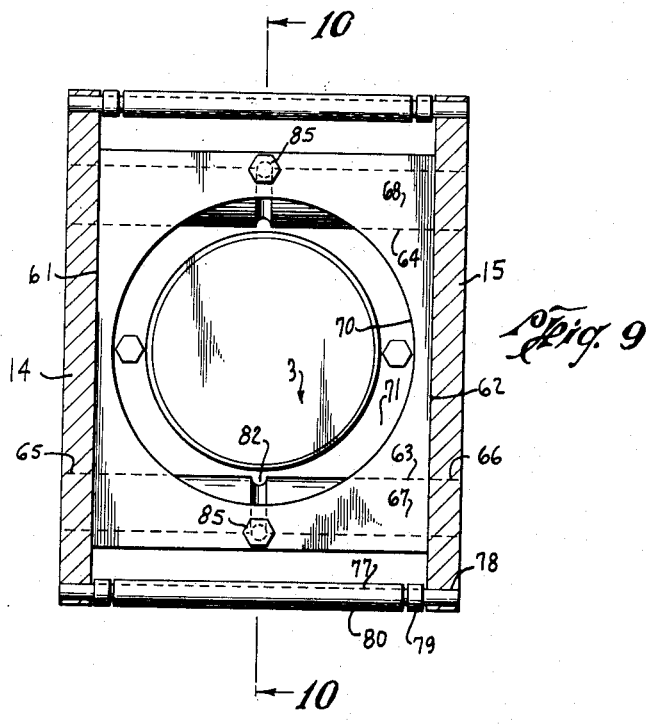
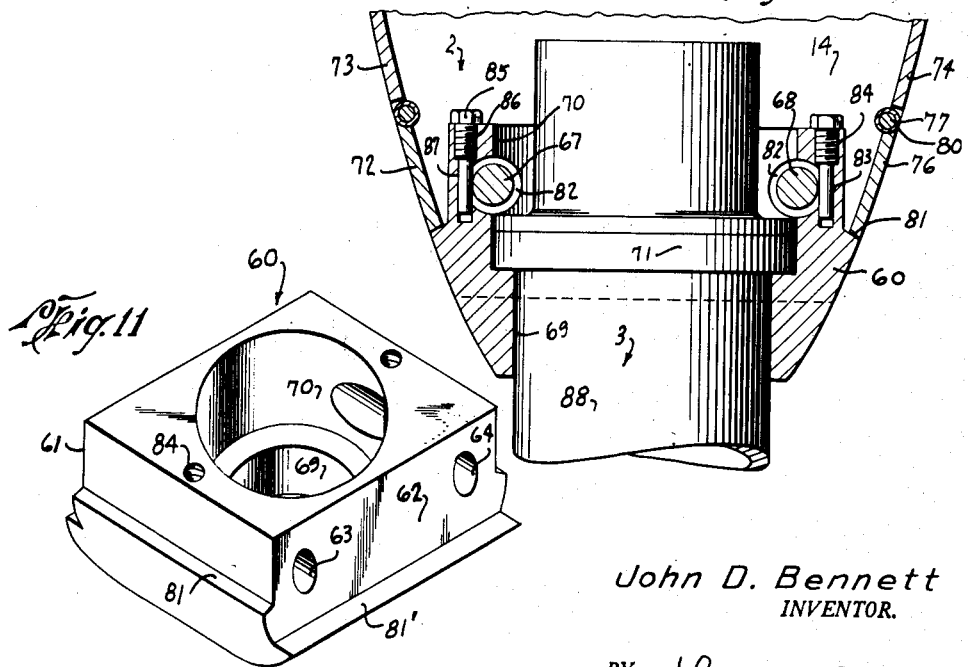
John D. Bennett
INVENTOR.
BY Lester B. Clark.
ATTORNEY Nov. 3, 1953  
J. D. BENNETT  
2,657,905  
TRAVELING BLOCK  
Filed June 6, 1951  
6 Sheets-Sheet 5

John D. Bennett  
INVENTOR.

BY Lester B. Clark,  
ATTORNEY

Nov. 3, 1953   J. D. BENNETT   2,657,905
TRAVELING BLOCK
Filed June 6, 1951   6 Sheets-Sheet 6
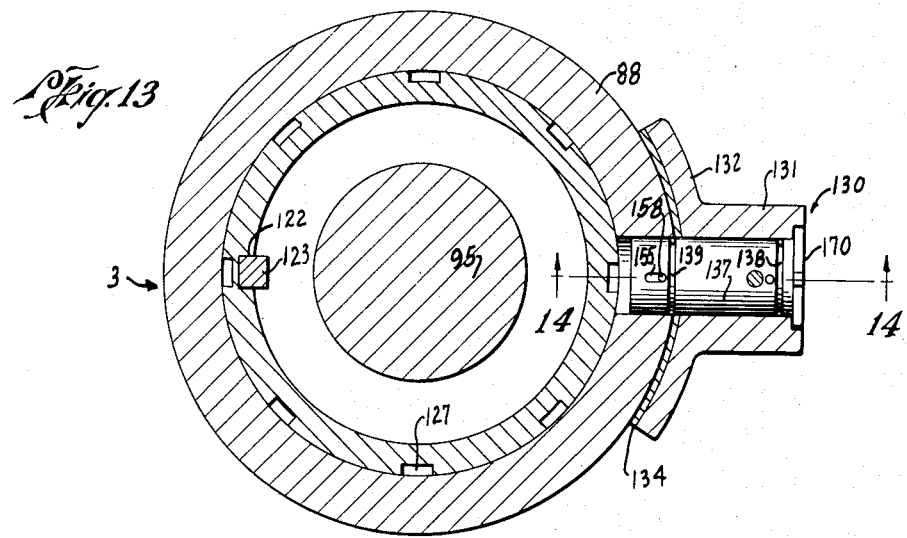
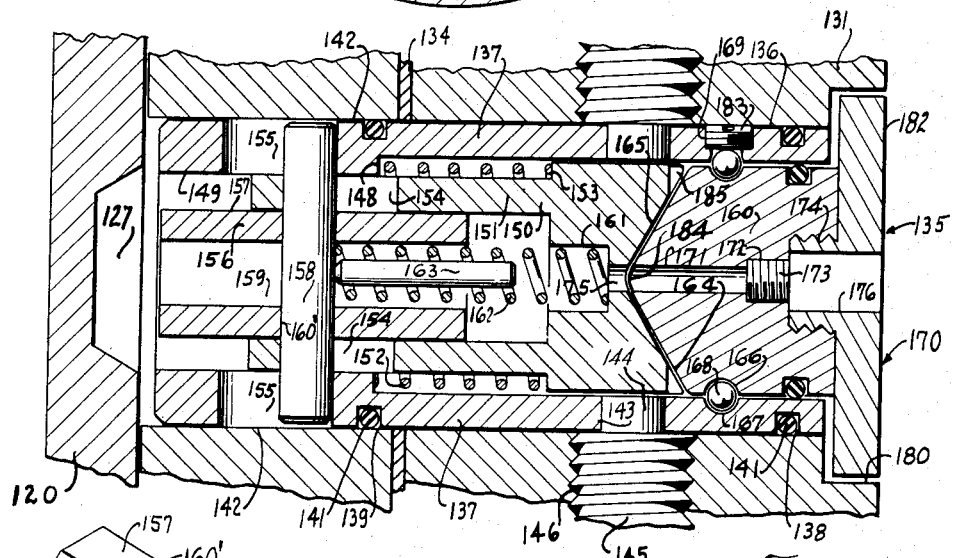
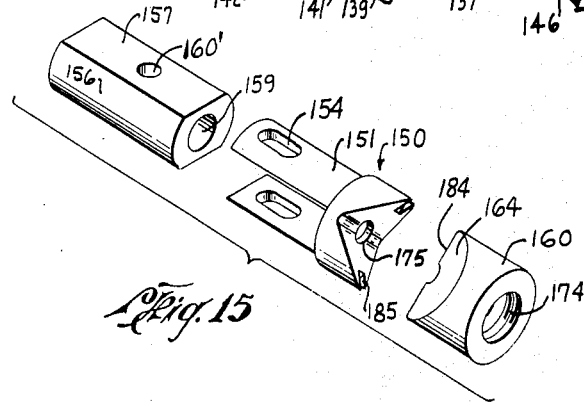
John D. Bennett
INVENTOR.
BY Lester B Clark.
ATTORNEY Patented Nov. 3, 1953

2,657,905

UNITED STATES PATENT OFFICE 2,657,905

TRAVELING BLOCK

John D. Bennett, Beaumont, Tex., assignor to Dresser Equipment Company, Beaumont, Tex., a corporation of Ohio Application June 6, 1951, Serial No. 230,221

15 Claims. (Cl. 254—192)

This invention relates to an improved traveling block which has incorporated therein a number of novel features which co-operate to insure a more efficient sheave operation, more efficient load transmission, and a more efficient structure for locking the hook stem against rotation with relation to the spring housing.

It is therefore an object of this invention to provide an improved traveling block which is more efficiently assembled, has a more efficient sheave operation, transmits loads more efficiently, and which has a more efficient means for locking the hook stem against rotation with relation to the spring housing.

It is a more specific object of this invention to provide means for locking the sheave bearing pin against rotation in the traveling block housing while at the same time permitting the pin to expand axially under heat of friction in at least one direction.

It is also a more specific object of this invention to provide a roller bearing mounted sheave construction in which the radial faces of the sheave roller bearing units are specially hardened to prevent wear due to contact with the adjacent face.

Whereas it has been stated that this invention considers a more efficient sheave operation, and a more efficient means of connecting sheave bearing pin to the housing, the construction of sheaves disclosed is not claimed in this application but is covered in co-pending application Serial Number 209,680, of Richard R. Bloss, for Wire Line Sheave and Method of Fabrication, filed February 6, 1951.

It is a further more specific object of this invention to provide a traveling block housing assembly which includes a novel lower block section especially adapted to transmit the hook load to the housing assembly side plates, and especially adapted to prevent the connection pins between side plates and lower block section from axial dislocation in operation.

It is yet another more specific object of this invention to provide a traveling block spring housing assembly in which a load on the hook is transmitted against spring tension via a spring retainer rotatable about the hook stem, to a shoulder in the spring housing while the means for locking the hook stem against rotation is located below such shoulder and does not transmit any of the load.

It is yet a further more specific object of this invention to provide a traveling block spring housing assembly having a specially assembled hook stem cap.

It also is yet another more specific object of this invention to provide a spring housing assembly in which the spring around the hook stem between cap and spring retainer normally urges the spring retainer against a flange on the hook stem.

It is still a further more specific object of this invention to provide a locking mechanism which can be installed on the spring housing and which includes a lock unit which is insertable in assembled condition into the spring housing to be locked in position.

It is also a still further object of this invention to provide a lock unit of this class which is adapted to yieldably lock a locking sleeve to which the hook stem is splined, against rotation with relation to the spring housing.

Other and further objects will be apparent when the specification is considered in connection with the drawings in which:

Fig. 1 is an end elevation, part in section, of the assembled traveling block of this invention;

Fig. 2 is an elevation of the traveling block of Fig. 1 shown in relation to the swivel and kelly of a drilling rig;

Fig. 5 is a fragmentary side view taken along line 5—5 of Fig. 4;

Fig. 6 is a sectional plan view taken through the bearing center pin as indicated by line 6—6 of Fig. 4;

Fig. 7 is a perspective view of the locking ring shown in Fig. 6;

Fig. 8 is a sectional end elevation showing a modified form of bearing center pin;

Fig. 9 is a sectional plan view taken along line 9—9 of Fig. 4;

Fig. 10 is a fragmentary sectional side elevation taken along line 10—10 of Fig. 9;

Fig. 11 is a perspective view of the lower block section shown in Fig. 10;

Fig. 13 is a sectional plan view taken along line 13—13 of Fig. 12;

Fig. 14 is an enlarged sectional end elevation taken along line 14—14 of Fig. 13;

Fig. 15 is a perspective development of lock parts shown in Fig. 14.

Figures 3, 4:
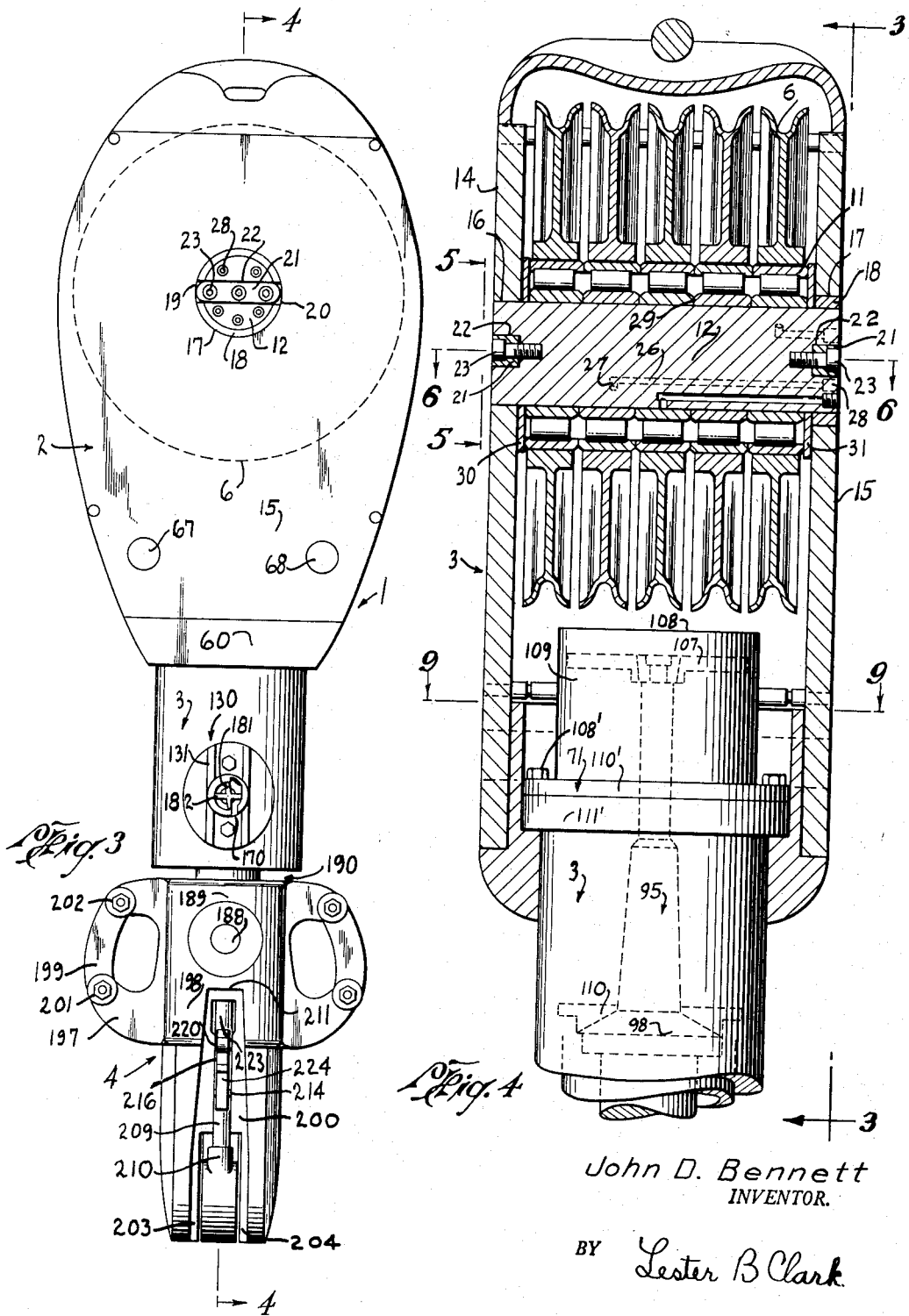
Fig. 3 is a side elevation taken along line 3—3 of Fig. 1 and line 3—3 of Fig. 4.
Fig. 4 is an end elevation, part in section, and in enlarged detail, of the upper portion of Fig. 1, taken along line 4—4 of Fig. 3 and line 4—4 of Fig. 6.

As shown in Fig. 1, a traveling block 1 comprises the housing assembly 2, the spring housing assembly 3, and the hook assembly 4. As shown in Fig. 2, the cables 5 extend from the sheaves 6 in the housing assembly 1 upwardly to the crown block, not shown, at the top of a derrick employed in the rotary method of drilling wells.

The hook assembly 4 supports bails 7, shown in dotted lines, which support the swivel 8 and therebelow the kelly 9, which is rotated by the rotary table, not shown, at substantially the derrick floor, while drilling fluid, as chemical mud is supplied into the gooseneck 10 of the swivel to pass down the kelly and tubular drilling string as the kelly is rotated. The drawworks of the rig actuates one end of the cable and the other end is anchored, and thus motion of the cable raises the traveling block and parts suspended therebelow, or lowers them, as while drilling progresses.

As shown in Figs. 4, 6, and 8, each sheave 6 surrounds a roller bearing unit 11, which is fitted upon a bearing pin 12. Under constant operation, the friction developed by the rotation of the sheave elements on the bearing pin develops sufficient heat to result in the expansion of the bearing pin in an axial direction.

This expansion, if restrained, can result in springing the side plates apart, or else can result in radial expansion of the pin causing the sheaves to bind. In order to maintain proper sheave operation, it has been found necessary to provide means to lock the bearing pin 12 to the side plates 14 and 15 of the housing assembly 2, in order to prevent rotation of the bearing pin while at the same time permitting this axial expansion of the bearing pin in length in at least one direction.

Figs. 3-7 show in detail one modification of bearing pin 12 installed at one end in the bore 16 of the side plate 14 and at its other end fitting in the locking ring 18 in the bore 17 of the side plate 15. The ring 18 has the diametrically extending slots 19 and 20 therein, and the locking key 21 is of a length to provide a central portion 37 to bear upon the slot 22 in the end of the bearing pin, and its ends 35' and 36, respectively, bear upon the slots 19 and 20 in the ring 18. The screws 23 are provided to connect the key 21 to the pin 12.

On the other end of the pin 12, a slot 22 is also provided and outwardly therefrom on either end of the slot 22, slots 24 and 25 are provided in the side plate 14. Thus, when a key 21 is inserted in these slots and connected to the pin 12 by means of the screws 23, this end of the pin is locked against expansion or extension, thereby directing the expansion to the other end of the pin.

The pin 12 may have a plurality of axially extending grooves 26 therein connected with radially extending ports 27 so that the plug 28 in the pin end may be removed and grease inserted at intervals to lubricate the pin periphery. To insure proper distribution of the lubricant these grooves extend to ports at variously spaced distances from the pin ends.

A plurality of sheaves 6 must be provided, five being shown, as the load to be supported varies with the depth of the well and a greater mechanical advantage is required for the drawworks to support the load at considerable depths than at shallow depths. Therefore at one depth, one or two sheaves may be employed while at another depth all five sheaves may be employed.

Therefore, it has been found necessary to harden the radially extending faces 29 of the roller bearing units 11, since the rotational contact between these adjacent surfaces will otherwise result in excessive wear by the accompanying play of such misalignment as to introduce binding on the bearing pin 12 or exceptional wear on the cables 5.

If sheave wear can be minimized, and if axial expansion of the bearing pin can be adequately provided for, without springing apart the plates 14 and 15, it can be seen that the over-all width of the sheaves axially of the bearing pin 12 may remain substantially constant, as well as the distance between the inner faces of the plates 14 and 15. Thus it is possible to provide the thrust washers 30 and 31 around the pin 12 adjacent the inner faces of the plates 14 and 15 to act as shims, to protect the inner faces of the side plates against wear, and to take up the axial thrust of the end roller bearing units 11.

In the modification shown in Fig. 8, the side plate 15 has the bore 42 therethrough, while the side plate 14 has the key body slot 43 therein and the key head slot 44. The ring 45 fits in the bore 42 while the key 47 has the head 48 and the body 49 to fit respectively in the body slot 43 and head slot 44. The pin 12 has the turned down end portion 46 to abut the body 49 of the key 47 so that the pin shoulder 50 abuts the thrust washer 30. Screws 23 connect the key 47 to the pin 12. At the other end of the pin 12, the screw 51 fits in the radial counterbore 52 and threaded bore 53 of the ring 45, and is threaded into the pin at 54 to connect the ring to the pin. With this modification, the pin may extend under heat of friction to the right as shown in Fig. 8, while the ring 45 slides in the bore 42 as the pin expands, while the key 47 prevents rotation of the pin. Whereas the screw 51 has been shown employed to retain the ring 45 connected to the pin, a dowel in this construction is equally serviceable and may be used in place of the screw 51.

As shown broadly in Fig. 1, and in detail in Figs. 9, 10, and 11, housing assembly 2 has at the bottom thereof the lower block section or block 60 which is of substantially rectangular cross-section and which provides the side faces 61 and 62 to respectively fit in contact with the inner surfaces of the side plates 14 and 15 respectively.

The bores 63 and 64 in the block 60 communicate with the side plate bores 65 and 66, and the pins 67 and 68 are inserted through these bores to connect the side plates to the block 60. The block 60 has the bore 69 therein and the counterbore 70 to provide a shoulder to receive the flange element 71 of the spring housing assembly 3. The end plates 72 and 76, which inter-connect the side plates 14 and 15, have the hinge portions 73 and 74 connected thereto by means of the hinge pins 77 which are journalled at 78 in the side plates. The collars 79 limit axial movement of the hinge pins while the hinge elements 80 connect the hinge portions to the pins 77. The block 60 provides the ledges 81 against which the hinge portions 72 and 76 bear to complete the housing inclosure.

The pins 67 and 68 have the grooves 82 therein and the block 60 has the bores 83 and threaded counterbores 84 therein. Thus the hinge portions 73 and 74 may be lowered and the locking pins 85 installed by threading the upper portions 86 thereof into the threaded counterbores 84 so that the pin ends 87 thereof extend into the grooves 82 to lock the pins 67 and 68 against axial displacement. Ledges 81' are provided on the block 60 below the faces 61 and 62 to abut the lower edges of the side plates 14 and 15 to close the housing assembly 2.

Figure 12:
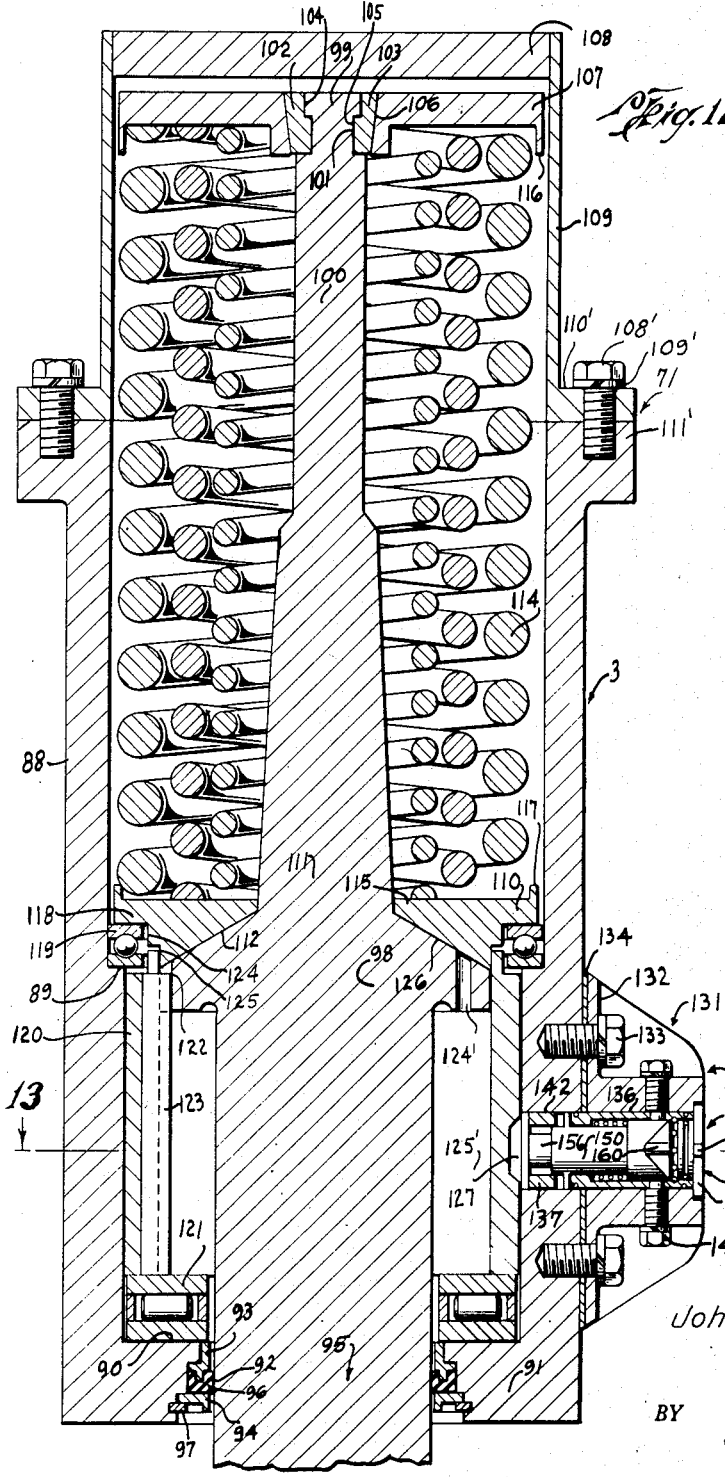
Fig. 12 is an enlarged sectional end elevation of the spring housing assembly shown in Fig. 4.

The spring housing assembly 3, shown broadly in Figs. 1–4, and in detail in Fig. 12, comprises the main housing 88 which has the upper shoulder 89 therein and the lower shoulder 90 in the base 91 which provides the sealed bore 92 around the lower extending portion of the hook stem 95. Such sealed bore 92 has the upper and lower seal retaining rings 93 and 94 to confine the seal 96, and the locking ring 97 to confine the sealing assembly.

The hook stem 95 has the outwardly and downwardly tapered flange 98 thereon, and thereabove the head 99 of lesser diameter than the upper stem portion 100, and which has therein the annular groove 101. The half-nuts 102 and 103 are bored and counterbored at 104 and 105 respectively, before they are split into their individual parts from a parent tubular member. Such half-nuts are tapered inwardly and downwardly to fit in the taper 106 in the cap 107 so that, with the top closure 108 of the bonnet 109 removed, the cap 107 may be easily and positively assembled to the hook stem by the insertion of the half-nuts 102 and 103 into the tapered cap portion 106 and around the stem head 99.

The spring retainer 110 fits around the hook stem portion 111 and bears upon the tapered portion 112 of the flange 98 so that the plurality of concentric springs 114 may bear upon the upper face 115 of the spring retainer 110. Thus the springs 114 are confined in assembly between the spring retainer 110 and the cap 107 while the side flanges 116 and 117 of the cap and retainer, respectively, prevent lateral displacement of the springs.

The spring retainer outer flange portion 118 bears upon the ball bearing unit 119 which fits upon the upper shoulder 89 of the main housing 88. The locking sleeve 120 is supported upon the roller bearing assembly 121 which rests upon the lower shoulder or base 90 of the main housing. The flange 98 is of an outer diameter to fit within the locking sleeve 120 and has the groove 122 therein to receive the spline or key 123 which extends from the inner periphery of the locking sleeve.

The spring retainer 110 and the locking sleeve 120 are turned down at 124 and 125 respectively to clear the ball bearing unit 119. The port 124' is provided in the flange 98 to permit the upward passage of lubricant therethrough, such lubricant filling the interior 125' of the locking sleeve to lubricate the roller bearing assembly 121, to create a dash-pot effect to dampen the descent of the hook stem 95 under load conditions, and to lubricate the surface contact 126 between spring retainer 110 and flange 98, and also to lubricate the ball bearing unit 119.

In operation it is often desirable to permit a load suspended from the hook assembly 4, as by the bails 7, to swing freely, while at other times it is desirable to lock the hook stem 95 against rotation with relation to the spring housing 3. For this purpose the locking sleeve 120 has the groove 127 in the outer periphery thereof for cooperation with the locking mechanism 130 to be described hereinbelow.

The screws 108' and lock washers 109' are provided to assemble the bonnet flange 110' and main housing flange 111' together to complete the flange element 71.

A desirable locking mechanism for the exposed surface required of a traveling block should include a case easily installed on the spring housing of the block and a lock assembly easily insertable in the case, as an assembled unit, with means included for sealing the inner working parts against the elements.

To this end this invention provides such mechanism 130 shown broadly in Fig. 3, and in detail in Figs. 12–15, which includes the case 131 which has the flanges 132 thereon through which the cap screws 133 extend to connect the case to the spring housing 3, the gasket or seal 134 being interposed between case and spring housing.

The case 131 has the bore 136 therethrough so that when the case is installed, such bore is aligned with the bore 142 in the spring housing.

As shown most clearly in Figs. 14 and 15, the locking unit 135 includes the shear pipe 137 as the outer element thereof. Such shear pipe has the annular grooves 138 and 139 therein to receive sealing elements 141 which seal against the bores 136 and 142. The shear pipe 137 also has the radial holes or bores 143 therein to receive the ends 144 of the locking pins 145 which are threadable at 146 through the wall of the case 131.

The shear pipe is bored to provide the shoulder 148, and the piston cam 150 has the side members 151 which fit in the shear pipe slot 149 while the spring 152 is confined between the shoulders 153 and 148 to urge the piston cam outwardly. Also the shear pipe has the opposed axially extending slots 155 therein to communicate with the slots 154 in the piston cam.

Thus, the plunger 156, having the flat surfaces 157, may be slidably inserted between the side members 151 while the plunger pin 158 extends across the plunger bore 159, and through the plunger holes 160' and into the slots 154 and 155 on either side of the plunger. The piston cam 150 is bored at 161 to provide a seat for the spring 162 which seats, at its other end, on the pin 158, while the guide pin 163 floats within the spring 162.

The cam 160 has the triangular cross-sectioned cam portion 164 which fits into the slot 165 in the piston cam, which is of substantially V-shaped cross section. The cam 160 has also the annular peripheral groove 166 therein to be brought into coincidence with the matching annular groove 167 in the shear pipe wall to cooperate therewith in inclosing the ball bearings 168 which rotatably connect the cam 160 to the shear pipe. The radially extending threaded bore 169 is provided in the shear pipe wall through which the ball bearings 168 may be inserted to be retained therein by the plug 183.

The cam 160 has the bore 171 therethrough, and outwardly thereof the threaded counterbore 172 to receive the plug 173 and the threaded counterbore 174 to receive the handle 170. This handle 170 has the bore 176 therein so that the plug 173 may be removed and lubricant inserted to pass through the bore 171 and the port 175 in the piston cam to oil the inner working parts of the locking unit.

The handle 170 has two pairs of diametrically opposed, radially spaced prongs 181 and 182 thereon, which extend into the counterbore 180 in the case 131. One pair has a different configuration than the other pair, and a pole may be employed having a conventional pronged hook thereon to fit within the prongs of the handle to rotate it, and the connected cam 160, through 90° to extend or retract the plunger 156 to lock or unlock the locking sleeve 120, as will hereinbelow be described.

As one pair of opposed prongs is of a different configuration than the other pair, the relative positions of the prongs can indicate whether the locking sleeve is locked or unlocked.

In operation, when the locking unit 135 is turned 90°, the cam portion 164 forces against the surface of the cam slot 165 to force the piston cam 158 inwardly until the apex 184 of the cam portion rests in the slot 185 at the outermost portion of the piston cam. The inward movement of the piston cam compresses the spring 162 to force the plunger pin inwardly in the slots 154, and its ends move from the position in the slots 155 shown in Fig. 14 to the inner portions of these slots. Thus, the plunger 156 is yieldably forced into the groove 127 in the locking sleeve 120 while the apex 184 of the cam portion 164 rests in a yieldably locked position in the slot 185 against dislocation except upon the application of a substantial rotational force to the prongs of the handle 170.

As shown in Figs. 1 and 3, the hook stem 95 has the lateral bore 187 therethrough to receive the hook pin 188 which journals in the bores 191 and 192 in the top section 189 of the hook 190. This pin 188 has the lubricant passage 193 therein which is accessible through the plug 194 between the webs 195 of the hook. The pin 196 connects the hook pin 188 to the hook against rotation and axial displacement.

The brackets 197 extend laterally from the body 198 of the hook and have the links 199 pivotally connected thereto at 201 and 202 to inclose elements, as bails, at certain stages of drilling.

The latch housing 200 has the side members 203 and 204 which are pivoted on the pin 205 on either side of the projection 206 which extends outwardly from the central portion of the lower hook section 207. The saddle 208 has the downward projection 209 to abut the lug 210 on the projection 206 when the latch is opened, and this saddle cross-connects the side members 203 and 204, as does the top cross-piece 211, to tie the latch housing together into an integrated unit.

The pin 214 is supported in the side members 203 and 204 and extends through the slots 215 of the latch 216 so that the spring 217 may bear at its lower end on the pin 214 and at its upper end on the latch surface 218. Thus, this spring forces the latch upwardly so that the arcuate portion 219 thereof bears upon the retaining pin 220 which extends between the side members 203 and 204 and is supported therein.

In this position, the latch prong 221 fits into the receiving slot 222 in the lug 223 which extends from the hook body 198 and the latch housing 200 is thus retained in position to enclose and support a member, as the bail 7, shown suspended therefrom in Fig. 2. The handle 224 on the latch 216 is provided so that a shepherd's hook or some other means may be connected thereto to exert an an unlatching force against the tension of the spring 217.

Broadly, this invention pertains to an improved traveling block having a shear bearing pin adapted to expand axially while being restrained against rotation with relation to the traveling block housing. It also broadly pertains to such a traveling block having an integrated lower block section connected to the traveling block housing side plates by pins easily adapted against axial displacement. Additionally, it broadly relates to a spring housing assembly in which the means for locking the hook stem against rotation with relation to the spring housing does not support any of the load which may be placed on the hook and yieldably supported hook stem; and additionally it broadly pertains to a locking mechanism adapted to be installed on the spring housing and including a locking unit easily installed in the case of the mechanism and adapted to yieldably lock and unlock the locking sleeve to the spring housing.

What is claimed is:

1. In a traveling block having a housing including opposed side plates and opposed end plates connecting said side plates, a bore in one of said side plates and a larger bore concentric therewith in the other of said side plates, a locking ring in said larger bore having a diametrically extending slot therein, a bearing pin having diametrically extending slots in each end thereof, said pin extending through said first bore at one end and into said locking ring at the other end so that the slot in the other end communicates with the locking ring slot, a plurality of sheaves, each including a roller bearing member to rotate about said pin, the radial faces of said bearings being hardened to rotatably bear end to end against each other in lateral thrust contact, a thrust washer about said shaft adjacent each side plate to space said sheaves from said side plate and to contact the outer faces of the end roller bearing members, slot portions in said first side plate to communicate with either end of the pin slot at that end, a first key to fit in said ring slot and communicating pin slot, a second key to fit in the other pin slot and the communicating side plate slot portions, and screw means to connect each key to said pin.

2. In a traveling block having a housing including opposed side plates and opposed end plates connecting said side plates, a bore extending through one side plate, a locking ring in said bore having a diametrically extending slot therethrough, a bearing pin extending at one end into said locking ring and having a turned down portion at the other end thereof and having a diametrically extending slot in the locking ring end thereof for alignment with said ring slot, a key having a central portion to fit in said pin slot and outwardly extending portions therefrom to fit in said ring slot, screw means to connect said key to said pin, a slot in the inner face of the side plate adjacent said turned down pin portion and a slot in the outer surface of said side plate communicating with, and over-extending each end of said inner slot, a key having a body portion to fit in said inner slot to abut the other end of said pin and having a head to fit in said outer slot, screw means to connect said key to said pin, a plurality of sheaves, each including a roller bearing member to rotate about said pin, the radial faces of said bearings being hardened to rotatably bear end to end against each other in lateral thrust contact, and a thrust washer about said shaft adjacent each side plate to space said sheaves from said side plate and to contact the outer faces of the end roller bearing members.

3. In a traveling block having a housing including opposed side plates and opposed end plates connecting said side plates, a bore extending through one side plate, a locking ring in said bore, a bearing pin extending through said locking ring at one end and turned down at the other end, a slot in the inner face of the side plate adjacent said turned down pin portion and a slot in the outer surface of said side plate communicating with, and over-extending each end of said inner slot, a key having a body portion to fit in said inner slot to abut said turned down end and a head to fit in said outer slot, screw means to connect said key to said pin, a radially extending bore and counterbore in said locking ring, means insertable in said bore to engage said pin and having a head beneath the periphery of said ring to shoulder against said counterbore, a plurality of sheaves, each including a roller bearing member to rotate about said pin, the radial faces of said bearings being hardened to rotatably bear end to end against each other in lateral thrust contact, and a thrust washer about said shaft adjacent each side plate to space said sheaves from said side plate and to contact the outer faces of the end roller bearing members.

4. In a traveling block including a housing assembly and a spring housing shouldered therein and extending therebelow to provide a radial bore, a hook stem yieldably and rotatably supported in said spring housing and extending therebelow for connection to a hook assembly, a locking sleeve rotatably supported in said spring housing and internally splined to said stem and having a groove in the outer surface thereof, a locking mechanism including, a lock case adapted for connection to said spring housing and having a bore therethrough co-axial with said radial bore, set screw bores through said case perpendicular to said case bore, a lock assembly comprising, a shear pipe insertable in said case bore and radial bore and having holes through the wall thereof to align with said set screw bores, set screws insertable in said set screw bores and said hole to lock said pipe to said case, a piston cam insertable in said shear pipe, said shear pipe and said piston cam providing spaced apart shoulders and a spring surrounding said piston cam to bear on said shoulders, a hollow plunger insertable in said piston cam, opposed slots in said shear pipe wall and piston cam wall, opposed radial bores in said plunger wall, a plunger pin extending through said plunger bores and said slots, an inner spring in said piston cam to bear against said plunger pin, a locking cam connected for rotation within said shear pipe and having a cam portion thereon in engagement with the cam of said piston cam and adapted upon rotation to move said plunger axially inwardly to engage in said sleeve groove to yieldably lock said spring housing and said sleeve and stem against rotation, said cam including indexed handle means to indicate locked or unlocked position to an observer.

5. In a traveling block, a housing including opposed side plates and opposed end plates connecting said side plates, a lower block section of substantially rectangular cross-section in the horizontal plane and having a vertical bore and counterbore centrally therethrough and providing opposed end faces and opposed side faces to fit within said plates and opposed ledges to abut the lower edges of said side plates, a spring housing extending through said bore and having a flange element to shoulder upon said counterbore, a pair of spaced apart bores through said side plates and said side faces and parallel to, and adjacent said end faces, a pin through each bore above said flange element to connect said block section and said end plates and to confine said flange element, an annular groove in each pin, vertically extending locking pins in said block to fit in each groove to lock each pin against axial movement, said end plates including a lower hinged portion to permit the insertion and removal of said locking pins, and said block section having opposed ledges below said end faces to abut the lower edges of said hinged portion, the weight of a load supported by said spring housing being transferred from said flange element to said block section and from said block section, via said pins, to said side plates.

6. In a traveling block, a housing assembly including a lower block section having a bore and a counterbore therethrough, a spring housing extending through said bore and having an external flange element to shoulder upon said block and providing an upper internal shoulder and a bore through the base thereof providing a lower internal shoulder, a hook stem in said spring housing having a cap on the head thereof, a flange below said cap, and a lower portion extending below said flange and through said spring housing bore for connection to a hook assembly, a spring retainer on said stem to bear upon said flange and adapted to rotatably bear upon said upper shoulder, a sleeve below said upper shoulder and internally splined to said flange and adapted to rotatably bear upon said lower shoulder, spring means between said cap and said spring retainer to normally urge said retainer against said flange and yieldable under a load on said hook assembly to transfer said load through said retainer to said upper shoulder as said hook stem and flange move downwardly within said internally splined sleeve, said sleeve and said spring housing providing locking means to lock said sleeve and stem against rotation with relation to said spring housing.

7. In a traveling block having a housing including opposed side plates and opposed end plates connecting said side plates, a bearing pin assembly mounted in said side plates and including a pin to extend therebetween and also including means connecting said pin assembly to said plates to prevent rotation and adapted to permit said pin assembly to expand axially in at least one direction, a plurality of sheaves, each including a roller bearing member to rotate about said pin, the radial faces of said bearings being hardened to rotatably bear end to end against each other in lateral thrust contact, a thrust washer about said shaft adjacent each side plate to space said sheaves from said side plate and to contact the outer faces of the end roller bearing members, a lower block section of substantially rectangular cross-section in the horizontal plane and having a vertical bore and counterbore centrally therethrough and providing opposed end faces and opposed side faces to fit within said plates and opposed ledges to abut the lower edges of said side plates, a spring housing extending through said bore and having a flange element to shoulder upon said counterbore, a pair of spaced apart bores through said side plates and said side faces and parallel to, and adjacent said end faces, a pin through each bore above said flange element to connect said block and said end plates and to confine said flange element, an annular groove in each pin, vertically extending locking pins in said block to fit in each groove to lock each pin against axial movement, said end plates including a lower hinged portion to permit the insertion and removal of said locking pins, and said block section having opposed ledges below said end faces to abut the lower edges of said hinged portion, the weight of a load supported by said spring housing being transferred from said flange element to said block section and from said block section, via said pins, to said side plates, said spring housing having an external flange element to shoulder upon said block and providing an upper internal shoulder and a bore through the base thereof providing a lower internal shoulder, a hook stem in said spring housing having a cap on the head thereof, a flange below said cap, and a lower portion extending below said flange and through said spring housing bore for connection to a hook assembly, a spring retainer on said stem to bear upon said flange and adapted to rotatably bear upon said upper shoulder, a sleeve below said upper shoulder and internally splined to said flange and adapted to rotatably bear upon said lower shoulder, spring means between said cap and said spring retainer to normally urge said retainer against said flange and yieldable under a load on said hook assembly to transfer said load through said retainer to said upper shoulder as said hook stem and flange move downwardly within said internally splined sleeve, said sleeve having groove in the outer surface thereof, a locking mechanism including, a lock case adapted for connection to said spring housing and having a bore therethrough co-axial with said radial bore, set screw bores through said case perpendicular to said case bore, a lock assembly comprising, a shear pipe insertable in said case bore and radial bore and having holes through the wall thereof to align with said set screw bores, set screws insertable in said set screw bores and said hole to lock said pipe to said case, a piston cam insertable in said shear pipe, said shear pipe and said piston cam providing spaced apart shoulders and a spring surrounding said piston cam to bear on said shoulders, a hollow plunger insertable in said piston cam, opposed slots in said shear pipe wall and piston cam wall, opposed radial bores in said plunger wall, a plunger pin extending through said plunger bores and said slots, an inner spring in said piston cam to bear against said plunger pin, and a locking cam connected for rotation within said shear pipe and having a cam portion thereon in engagement with the cam of said piston cam and adapted upon rotation to move said plunger axially inwardly to engage in said sleeve groove to yieldably lock said spring housing and said sleeve and stem against rotation, said cam including indexed handle means to indicate locked or unlocked position to an observer.

8. In a traveling block having a housing including opposed, co-axially bored side plates and opposed end plates connecting said side plates, a bored bearing assembly between said side plates, a pin assembly extending through said bearing assembly bore and including a pin and means to lock one end of said pin to one of said side plates to prevent rotation of said pin, said pin assembly also including a shoulder spaced from said first side plate to bear against said bearing assembly to prevent axial movement of said pin assembly toward said first side plate, said pin assembly fitting within the other of said side plates whereby said pin may expand axially in the direction of said other side plate.

9. In a traveling block having a housing including opposed, co-axially bored side plates and opposed end plates connecting said side plates, a bored bearing assembly between said side plates, a pin assembly extending through said bearing assembly bore and including a pin and means to lock one end of said pin to one of said side plates to prevent rotation of said pin, said pin assembly also including a shoulder spaced from said first side plate to bear against said bearing assembly to prevent axial movement of said pin assembly toward said first side plate, said pin assembly fitting within the other of said side plates whereby said pin may expand axially in the direction of said other side plate, said bearing assembly comprising a plurality of bearing members to rotate about said pin, the radial faces of said bearing members being hardened to rotatably bear end to end against each other in lateral thrust contact, said traveling block including sheaves mounted about said bearing members.

10. In a traveling block having a housing including opposed, co-axially bored side plates and opposed end plates connecting said side plates, a bored bearing assembly between said side plates, a pin assembly extending through said bearing assembly bore and including a pin and means to lock one end of said pin to one of said side plates to prevent rotation of said pin, said pin assembly also including a shoulder spaced from said first side plate to bear against said bearing assembly to prevent axial movement of said pin assembly toward said first side plate, said pin assembly fitting within the other of said side plates whereby said pin may expand axially in the direction of said other side plate, said bearing assembly comprising a plurality of bearing members to rotate about said pin, the radial faces of said bearing members being hardened to rotatably bear end to end against each other in lateral thrust contact, said bearing assembly also including at least one thrust washer about said pin adjacent a side plate to space the adjacent bearing member and sheave from such side plate, said traveling block including sheaves mounted about said bearing members.

11. A locking mechanism including, a lock case having a bore therethrough, a locking assembly comprising, a shear pipe insertable in said bore, a piston cam insertable in said shear pipe, said shear pipe and said piston cam providing spaced apart shoulders, a spring surrounding said piston cam to bear on said shoulders, a hollow plunger insertable in said piston cam, opposed slots in said shear pipe wall and piston cam wall, opposed radial bores in said plunger wall, a plunger pin extending through said plunger bores and said slots, an inner spring in said piston cam to bear against said plunger pin, a locking cam connected for rotation within said shear pipe and having a cam portion thereon in engagement with the cam of said piston cam and adapted upon rotation to move said plunger axially outwardly, said plunger being of a length to protrude outside of said shear pipe when moved axially outwardly, means to lock said lock case to said shear pipe, said cam including indexing handle arms thereon relatively positionable to indicate the extended or retracted position of said plunger.

12. In a locking mechanism, a tubular housing, a cam rotatable in one end thereof, a piston cam including a cam portion, and resiliently urged toward said cam to place said cam portion in abutment therewith, a plunger within said housing and yieldably spaced from said piston cam, and adapted to be moved to extend from the end of said housing opposite said cam upon rotation of said cam to move said piston cam toward said plunger.

13. A housing to support a flanged tubular member therein, said housing comprising, opposed bored side plates and opposed end plates connecting said side plates a lower block section of substantially rectangular cross-section in the horizontal plane and having a vertical bore and counterbore centrally therethrough and providing opposed end faces and opposed side faces to fit respectively within said opposed end plates and said opposed side plates, a pair of parallel bores in said block co-axially aligned with said side plate bores and perpendicular to said faces and diametrically spaced apart across and intersecting the periphery of said counterbore and equally spaced above the shoulder formed by said counterbore, a pin through each block bore and extending into said side plate bores, and means insertable through said end plates to lock said pins against axial movement.

14. A housing to support a flanged tubular member therein, said housing comprising a plate portion of substantially rectangular horizontal cross-section, a lower block section to fit within said plate portion, a vertical bore and counterbore in said block to form a shoulder therein, a pair of parallel bores through said plate portion and said block diametrically spaced apart across and intersecting the periphery of said counterbore and spaced above said shoulder, a pin through each block bore and extending into said side plate bores, and means to lock said pins against axial movement.

15. The combination of a stem, spring, and spring housing assembly, said spring housing being adapted to bear upon, and extend through a support, said assembly including, a spring housing having a flange thereon to bear upon said support and providing an upper internal shoulder and a base, said base having a bore therethrough and providing a lower internal shoulder outwardly of said bore, a stem in said spring housing having a head and a cap on said head, a support flange below said cap, and a lower portion to extend through said spring housing bore, a sleeve below said upper shoulder and splined to said support flange and rotatably bearing upon said lower shoulder, a spring retainer on said stem to bear upon said support flange and adapted to rotatably bear upon said upper shoulder, spring means between said cap and said spring retainer to normally urge said retainer against said support flange and yieldable under a load on said stem to transfer said load through said retainer to said upper shoulder as said stem, including its support flange, moves downwardly within said internally splined sleeve, said sleeve and said spring housing providing locking means to lock said sleeve and said stem against rotation with relation to said spring housing.

JOHN D. BENNETT.

References Cited in the file of this patent
UNITED STATES PATENTS

| Number | Name | Date |
|---|---|---|
| 2,180,541 | Nichols | Nov. 21, 1939 |
| 2,511,729 | Maier | June 13, 1950 |